United States Patent
Rajauria et al.

(10) Patent No.: US 12,190,908 B2
(45) Date of Patent: Jan. 7, 2025

(54) NEAR-FIELD TRANSDUCER (NFT) DESIGNS FOR IMPROVED PERFORMANCE OF HEAT-ASSISTED MAGNETIC RECORDING (HAMR)

(71) Applicant: Western Digital Technologies, Inc., San Jose, CA (US)

(72) Inventors: Sukumar Rajauria, San Jose, CA (US); Erhard Schreck, San Jose, CA (US); Robert Smith, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/364,413

(22) Filed: Aug. 2, 2023

(65) Prior Publication Data
US 2024/0404556 A1 Dec. 5, 2024

Related U.S. Application Data

(60) Provisional application No. 63/504,944, filed on May 30, 2023.

(51) Int. Cl.
*G11B 5/00* (2006.01)
*G11B 5/31* (2006.01)
*G11B 13/08* (2006.01)

(52) U.S. Cl.
CPC ............ *G11B 13/08* (2013.01); *G11B 5/3106* (2013.01); *G11B 2005/0021* (2013.01)

(58) Field of Classification Search
CPC ... G11B 5/4866; G11B 5/3169; G11B 5/6029; G11B 5/6076; G11B 5/41; G11B 5/6088; G11B 2005/0021; G11B 5/314
USPC ......................................................... 360/59
See application file for complete search history.

(56) References Cited

U.S. PATENT DOCUMENTS

| | | |
|---|---|---|
| 8,902,720 B1 | 12/2014 | Schreck et al. |
| 10,083,713 B1 | 9/2018 | Simmons et al. |
| 11,127,421 B1 * | 9/2021 | Siangchaew ........... G11B 13/08 |
| 11,222,657 B1 * | 1/2022 | Seigler ................. G11B 5/4866 |
| 11,386,922 B1 | 7/2022 | Khamnualthong et al. |

* cited by examiner

*Primary Examiner* — Nabil Z Hindi

(57) ABSTRACT

A data storage device may include a media comprising a magnetic recording layer and a heat-assisted magnetic recording (HAMR) head for writing to the magnetic recording layer, the HAMR head comprising: a waveguide, a main pole comprising a main-pole surface facing the magnetic recording layer, a near-field transducer (NFT) situated between the main pole and the waveguide, and a transparent overcoat. The NFT comprises a main body and a micropillar. The micropillar comprises a micropillar surface facing the magnetic recording layer. A first distance between the micropillar surface and the media is less than a second distance between the main-pole surface and the media. The transparent overcoat is situated on the main-pole surface and the micropillar surface.

25 Claims, 9 Drawing Sheets

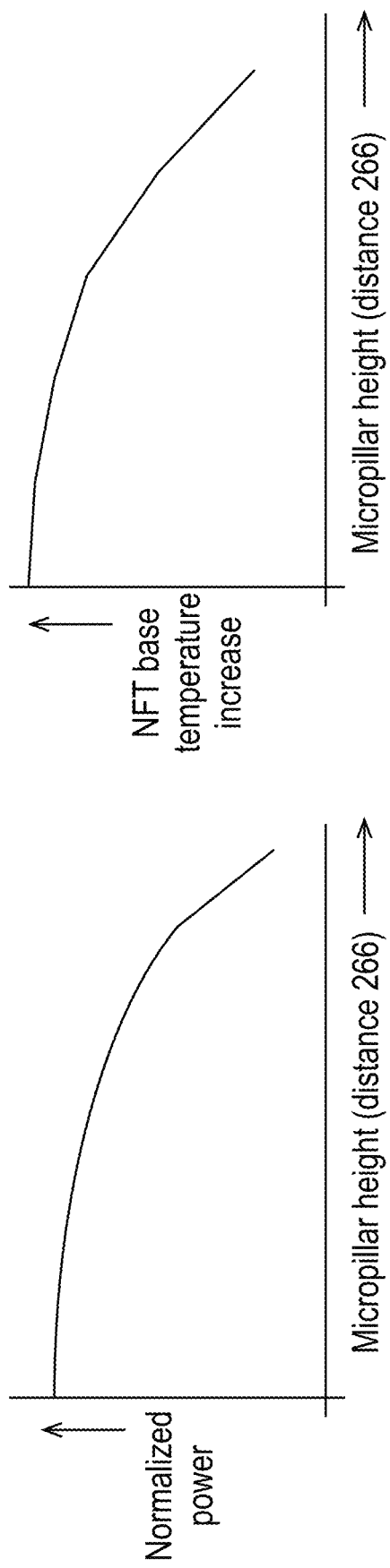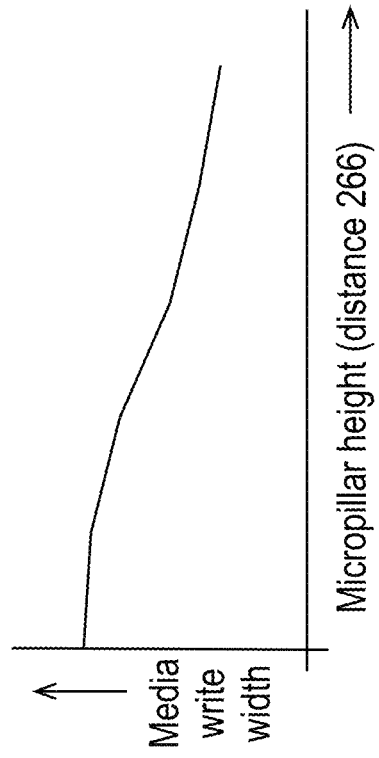
FIG. 6A
FIG. 6B
FIG. 6C

NEAR-FIELD TRANSDUCER (NFT) DESIGNS FOR IMPROVED PERFORMANCE OF HEAT-ASSISTED MAGNETIC RECORDING (HAMR)

CROSS-REFERENCE TO RELATED APPLICATIONS

This application claims the benefit of, and hereby incorporates by reference in its entirety for all purposes, U.S. provisional application No. 63/504,944, filed May 30, 2023 and entitled "NEAR FIELD TRANSDUCER (NFT) DESIGNS FOR IMPROVED PERFORMANCE OF HEAT-ASSISTED MAGNETIC RECORDING (HAMR)".

BACKGROUND

Improving the recording density of data storage devices is an ongoing objective. Such data storage devices include magnetic storage devices, such as magnetic disk drives. The use of thin-film magnetic heads, such as a composite thin-film magnetic head, and higher-performance magnetic recording media has enabled some level of improvement in storage capacity. A thin-film magnetic head may stack, on a substrate, a read head, including a magnetoresistive (MR) element, and a write head, including an induction-type electromagnetic transducer. In a magnetic disk drive, the thin-film magnetic head is mounted on a slider that flies slightly above the surface of the magnetic recording medium.

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher magnetic moment materials, or techniques such as perpendicular recording (or both).

An additional technique has been developed to allow the use of smaller write heads with higher coercivity magnetic recording media to improve areal density capacity. This technique uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy (Ku) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR devices have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the disk surface. (It is to be understood that the term "ABS" is used herein regardless of whether the gas in the drive is air or another gas (e.g., helium).) The NFT couples light onto the media at a spot of a size that is smaller than the optical diffraction limit, which heats a region of the media.

To write data, a magnetic field and heat are simultaneously applied to the area of the magnetic recording medium in which data is to be written. As a result, the temperature of the area increases and the coercivity decreases, thereby enabling the data to be written at a relatively modest magnetic field. In order to prevent unintended writing or erasing, the spot diameter of irradiated light should approximately match the size of a recorded bit.

There is an ongoing need for improved NFT and HAMR device designs to continue to improve storage capacities of data storage devices.

SUMMARY

This summary represents non-limiting embodiments of the disclosure.

In some aspects, the techniques described herein relate to a magnetic storage device including: a media including a magnetic recording layer; and a heat-assisted magnetic recording (HAMR) head for writing to the magnetic recording layer, the HAMR head including: a waveguide; a main pole including a main-pole surface facing the magnetic recording layer; a near-field transducer (NFT) situated between the main pole and the waveguide, wherein the NFT includes a main body and a micropillar, wherein the micropillar includes a micropillar surface facing the magnetic recording layer, wherein a first distance between the micropillar surface and the media is less than a second distance between the main-pole surface and the media; and a transparent overcoat situated on the main-pole surface and the micropillar surface.

In some aspects, at least one surface of the transparent overcoat is substantially perpendicular to the main-pole surface. In some aspects, the magnetic storage device further comprises an adhesion layer and/or a cladding layer situated between the NFT and the main pole, and the at least one surface of the transparent overcoat is situated (a) between the NFT and the magnetic recording layer, (b) between the adhesion layer and the magnetic recording layer, or (c) between the cladding layer and the magnetic recording layer.

In some aspects, a first surface of the transparent overcoat and a second surface of the transparent overcoat are substantially perpendicular to the main-pole surface. In some aspects, at least a portion of the micropillar is situated between the first surface of the transparent overcoat and the second surface of the transparent overcoat.

In some aspects, a side surface of the main body is aligned with a side surface of the micropillar. In some aspects, the side surface of the main body and the side surface of the micropillar abut an adhesion layer situated between the NFT and the main pole.

In some aspects, in an air-bearing surface view of the HAMR head, a geometric center of the micropillar is offset from a geometric center of the main body. In some aspects, the geometric center of the micropillar is closer to the main pole than the geometric center of the main body is.

In some aspects, the main body and the micropillar consist essentially of a same material or combination of materials. In some aspects, the same material or combination of materials includes gold, silver, aluminum, copper, ruthenium, rhodium, palladium, platinum, iridium, or alloys or combinations thereof.

In some aspects, the first distance is between approximately 0.1 nm and approximately 5 nm.

In some aspects, the transparent overcoat includes at least one of an oxide or a nitride. In some aspects, the oxide or the nitride includes silicon.

In some aspects, the transparent overcoat includes $Si_3N_4$, $TiO_2$, $ZrO_2$, $HfO_2$, $Nb_2O_5$, $Ta_2O_5$, $Sc_2O_3$, $Y_2O_3$, MgO, SiN, BN, SiBN, and/or SiBNC.

In some aspects, the transparent overcoat consists essentially of $Si_3N_4$.

In some aspects, the transparent overcoat consists essentially of silicon dioxide.

In some aspects, the main body consists substantially of a first material or combination of materials, and the micropillar consists substantially of a second material or combination of materials, and the first material or combination of materials differs from the second material or combination of materials.

In some aspects, in an ABS view, a shape of a media-facing surface of the micropillar is rectangular, square, oval, circular, or trapezoidal.

In some aspects, a shape of the micropillar is cuboid, cylindrical, or pyramidal.

In some aspects, the techniques described herein relate to a heat-assisted magnetic recording (HAMR) head for writing to a magnetic recording layer, the HAMR head including: a near-field transducer (NFT) including: a main body including a media-facing surface, and a micropillar including a micropillar surface, wherein, in an orientation in which the main-pole surface faces upward, the micropillar surface is situated above the media-facing surface; and a transparent overcoat situated over the main-pole surface and the micropillar surface.

In some aspects, in the orientation in which the main-pole surface faces upward, the micropillar is on top of the main body.

In some aspects, the micropillar is embedded in the main body.

In some aspects, a distance between the media-facing surface and the micropillar surface is between approximately 0.1 nm and approximately 5 nm.

In some aspects, a media-facing surface of the transparent overcoat is three-dimensional.

In some aspects, the main body and the micropillar consist essentially of a same material or combination of materials. In some aspects, the same material or combination of materials includes gold, silver, aluminum, copper, ruthenium, rhodium, palladium, platinum, iridium, or alloys or combinations thereof.

In some aspects, the main body consists substantially of a first material or combination of materials, and the micropillar consists substantially of a second material or combination of materials, wherein the first material or combination of materials differs from the second material or combination of materials.

In some aspects, the transparent overcoat includes at least one of an oxide or a nitride.

In some aspects, the waveguide is configured to propagate radiation at a selected wavelength, and the transparent overcoat is substantially transparent to the radiation at the selected wavelength.

In some aspects, the transparent overcoat includes $Si_3N_4$, $TiO_2$, $ZrO_2$, $HfO_2$, $Nb_2O_5$, $Ta_2O_5$, $Sc_2O_3$, $Y_2O_3$, MgO, SiN, BN, SiBN, and/or SiBNC.

In some aspects, the transparent overcoat includes silicon dioxide.

In some aspects, a shape of the micropillar surface is circular, rectangular, or trapezoidal.

In some aspects, a shape of the micropillar is cuboid, cylindrical, or pyramidal.

In some aspects, in an air-bearing surface view of the HAMR head, a geometric center of the micropillar is offset from a geometric center of the main body.

BRIEF DESCRIPTION OF THE DRAWINGS

Objects, features, and advantages of the disclosure will be readily apparent from the following description of certain embodiments taken in conjunction with the accompanying drawings in which:

FIG. 6A illustrates the trend of the normalized waveguide power needed to achieve a constant peak media temperature as a function of the height of the micropillar.

FIG. 6B illustrates the temperature increase of the NFT main body of the NFT as a function of the height of the micropillar as the HAMR device operates with the peak media temperature held constant.

FIG. 6C illustrates the media write width of a HAMR device as a function of the height of the micropillar when the HAMR device operates with the peak media temperature held constant.

Figures 1, 2:
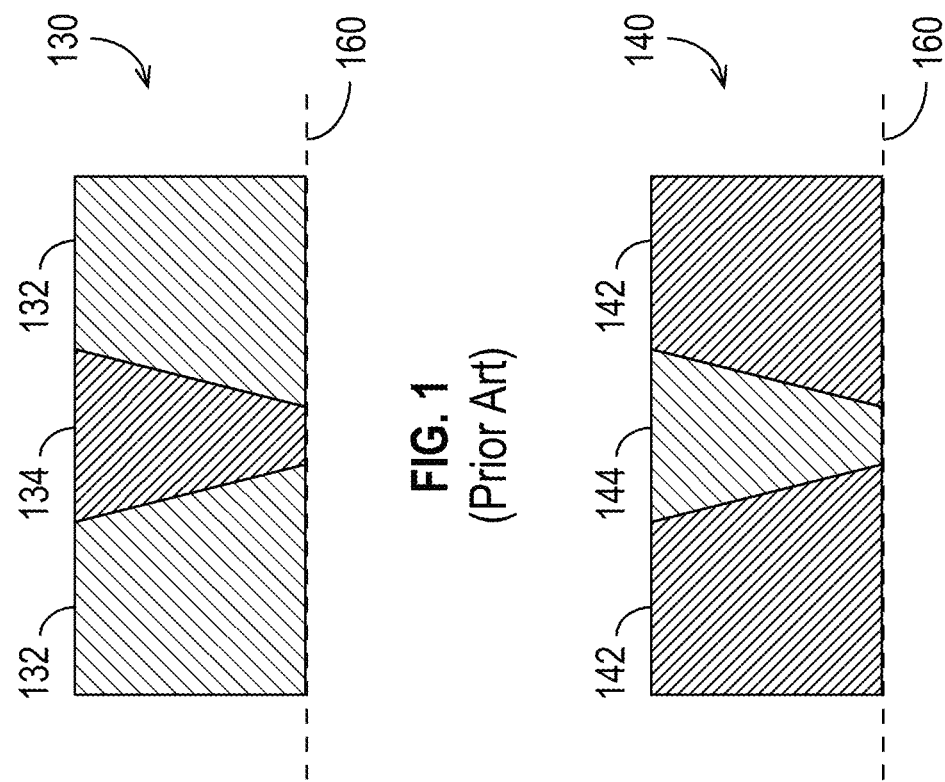
FIG. 1 illustrates a cross-section of a prior-art NFT in the "insulator-metal-insulator" or "IMI" configuration.
FIG. 2 illustrates another implementation of another prior-art NFT in a "metal-insulator-metal" or "MIM" configuration.

To facilitate understanding, identical reference numerals have been used, where possible, to designate elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

In HAMR devices, NFT reliability is important because NFT failures can cause failures of the overall data storage device. The NFT is typically made from a material with a high thermal conductivity, and it is designed to operate at high temperatures without degrading. The shape and size of the NFT are generally optimized to produce a small optical spot size while still delivering enough energy to heat the recording medium to the required temperature. The performance of the NFT is critical to the overall performance of a HAMR device because it directly affects the achievable areal density capacity (ADC).

As the size of each recorded bit decreases, the size of the optical spot must also decrease, and the HAMR device must still produce a high enough thermal gradient on the media in order to record bits reliably but at a higher ADC. Because the thermal gradient is inversely proportional to the size of the NFT, one way to reduce the optical spot size is to reduce the size of the NFT. Doing so, however, can compromise the reliability of the NFT, in part because it is more fragile due to being smaller. Scaling down other components of the HAMR device to account for the smaller NFT can also be challenging.

Another problem is that when NFTs generate near-field light by direct irradiation with light, some of the energy can be transformed into thermal energy and absorbed by the NFT. As the volume of the NFT decreases as it is made smaller, absorption of thermal energy by the NFT can be exacerbated. As a result, the temperature of a smaller NFT can increase even more significantly during operation. This temperature increase can cause the NFT to suffer repeated expansions in volume and/or deformations, which can shorten the lifetime of the NFT, the HAMR device, and, as a result, the data storage device.

FIG. 1 illustrates a cross-section of a prior-art NFT 130 in which a metal layer 134 is encased within an insulator layer 132 in a construct known in the art as the "insulator-metal-insulator" or "IMI" configuration. Because plasmonic metals have higher thermal expansion coefficients than dielectrics, as the NFT 130 heats up, the mismatch of thermal expansion coefficients between the metal layer 134 and the encasing insulator layer 132 creates high pressure, which causes plastic deformation or "flow" of the plasmonic metal. (As will be appreciated by those skilled in the art, a material's thermal expansion coefficient describes how the size of an object made from the material changes with a change in temperature. Specifically, the thermal expansion coefficient characterizes the fractional change in size per degree change in temperature at a constant pressure.) The amount of pressure developed is proportional to the product of (i) the mismatch of the coefficients of the thermal expansion, (ii) temperature, and (iii) the volume of the plasmonic metal in the NFT 130.

Increased temperatures may cause a relatively large, sharp pinpoint protrusion of the NFT 130 from the ABS 160 and toward the media passing below the slider. If the slider fly height is not adjusted to account for the protrusion, the protrusion may touch the magnetic recording medium, potentially shearing off and/or causing damage to or failure of the magnetic recording device. Alternatively, the protrusion can result in the slider having to fly at a larger distance from the magnetic recording medium than the optimal height, which may adversely affect the ability of the read head to read data on the magnetic recording medium.

An example of an IMI NFT is the so-called "lollipop" NFT, which has an enlarged disk-shaped region as a large plasmonic resonator and a peg as a smaller-scale structure that focuses light onto the media. The tip of the peg, at the slider ABS, may be covered in a thin layer of diamond-like carbon (DLC). In lollipop NFTs, the enlarged disk-shaped region receives concentrated light through the waveguide and is designed to help the NFT achieve surface plasmon resonance in response to this concentration of light. The disk-shaped region typically comprises most of the volume (e.g., between 90% and 95%) of the NFT. The peg is in optical and/or electrical communication with the disk-shaped enlarged region and creates a focal point on the media for the energy received by the enlarged region. Because the disk-shaped region is large in comparison to the peg, and the disk-shaped region is encased in an insulator that does not expand at the same rate as the plasmonic metal of the disk-shaped region, temperature increases of the disk-shaped region cause the smaller peg to expand in a way that is relatively dramatic and uncontrolled. For example, the pressure developed because of the mismatch of thermal expansion coefficients between the plasmonic metal and the encasing insulator may cause the peg to elongate in a way that is difficult to predict, potentially breaking the DLC protective layer at the ABS. In addition or instead, the peg may protrude toward the media as the disk-shaped region temperature increases and then retreat away from the media as the disk-shaped region's temperature decreases. These deformations of the peg can reduce the effectiveness of the NFT and the performance of the HAMR device. They may also lead to failure of the magnetic storage device or shorten its lifetime considerably.

FIG. 2 illustrates another implementation of an NFT 140, in which an insulator layer 144 is encased in a metal layer 142 comprising a plasmonic metal in a configuration known in the art as a "metal-insulator-metal" or "MIM" configuration. An increase in temperature may cause the metal layer 142 of the MIM NFT 140 to protrude from the ABS 160 in a more moderate and smooth way than with an IMI NFT 130. Even in this configuration, however, repeated deformation of the NFT can adversely affect the expected lifetime of the magnetic recording device.

Therefore, there is a continuing need for improved NFT and HAMR device designs that can provide a high thermal gradient (localized heating of the media) and high NFT reliability. Such improved designs, which provide the advantages of a smaller NFT without the attendant reliability issues, are disclosed herein. The disclosed NFTs include a main body and a micropillar that extends from the main body, closer to the media than the rest of the HAMR head components. Because of the small size of the micropillar, the NFT provides a higher thermal gradient than conventional NFT designs (e.g., a focused hot spot on the media), which helps to improve ADC without compromising the overall NFT dimensions. In other words, the micropillar allows the NFT to provide substantially the same effect as if the entire NFT were made smaller.

To solve the problem of the small-scale micropillar being fragile due to its size and the almost-inevitable interactions between the micropillar and the media moving below it, the media-facing surfaces of the NFT and other components of the HAMR head (e.g., the write pole) are protected by a durable and optically-transparent overcoat. The transparent overcoat allows light to propagate through it but provides protection to the NFT (and the micropillar). The transparent overcoat has both optical transparency and resistance to thermal oxidation to mitigate or prevent oxidation of the ferromagnetic material used in the write pole.

Unlike other overcoats that are sometimes used in recording devices (e.g., DLC), the transparent overcoat used in the disclosed designs is durable, meaning that it remains substantially intact as the data storage device operates, rather than wearing off or being burnished off (e.g., as DLC often is). As a result, the micropillar is encased in the transparent overcoat and is protected from both the deformations suffered by other type of NFT designs, and the interactions with the media that could otherwise jeopardize its durability. As a result of the micropillar being encased in the transparent overcoat, the transparent overcoat has a media-facing surface that is three-dimensional rather than flat, as in conventional devices.

An additional advantage of the disclosed approach is that the new NFTs absorb less heat than conventional NFTs, which further improves the lifespan of the NFT, the HAMR head, and the data storage device. As a result, the light source (e.g., laser) power required to achieve a specified media temperature for writing is reduced, and the size of the hot spot on the media is smaller. Alternatively, a higher media temperature and smaller hot spot size can be achieved using the same light source (e.g., laser) power.

Figure 3A:
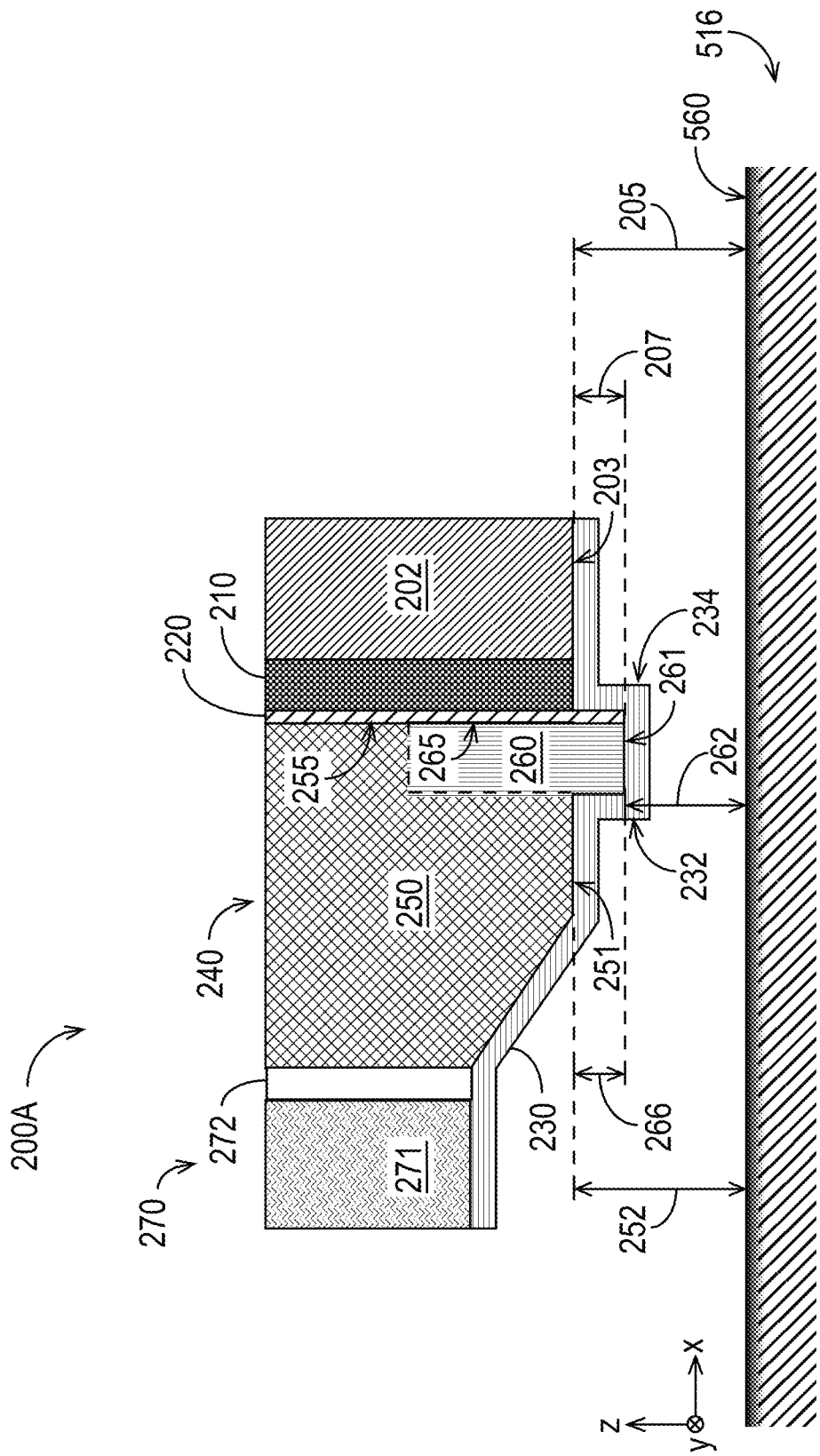
FIG. 3A illustrates an example of a portion of a HAMR head for writing to a magnetic recording layer of a media in accordance with some embodiments.

FIG. 3A illustrates an example of a portion of a HAMR head 200A for writing to a magnetic recording layer 560 of a media 516 in accordance with some embodiments. FIG. 3A shows x-, y-, and z-axes for reference. The view in FIG. 3A is of a cross-section of the HAMR head 200A in an x-z plane, with the media 516 shown below the HAMR head 200A. With the axes as defined in FIG. 3A, the data tracks on the media 516 reside in an x-y plane.

The portion of the HAMR head 200A shown in FIG. 3A comprises a number of components, including a main pole 202, a cladding layer 210, an adhesion layer 220, an NFT 240, a waveguide 270, and a transparent overcoat 230. It is to be appreciated that some of these components may be omitted (e.g., adhesion layer 220), and an implementation of the overall HAMR head may include components or elements not illustrated in FIG. 3A (e.g., additional adhesion layers, cladding, etc.).

The main pole 202, which may be conventional (e.g., made of conventional material(s) and having a conventional size/shape/placement within the HAMR head 200A), has a main-pole surface 203 that faces the magnetic recording layer 560 of the media 516. As shown in FIG. 3A, the main-pole surface 203 is separated from the media 516 by a distance 205 in the z-direction.

The cladding layer 210 may be provided to protect the main pole 202 from thermal damage due to the operation of the HAMR head 200A. The cladding layer 210 may be made of a material or combination of materials with high thermal conductivity to dissipate heat generated during the write process and mitigate damage to the main pole 202. Such materials are known in the art and are not described further herein.

As will be understood by those having ordinary skill in the art, the material(s) used for the NFT 240, described further below, might not adhere satisfactorily or easily to the material(s) used for the cladding layer 210. Therefore, an adhesion layer 220 may be included to provide a surface more conducive for adhesion by the material(s) used for the NFT 240. The adhesion layer 220 may improve manufacturing reliability and/or provide for simpler manufacturing of the HAMR head 200A.

The waveguide 270 comprises a waveguide core 271 and waveguide cladding 272, both of which can be conventional (e.g., made of conventional material(s) and having a conventional size/shape/placement within the HAMR head 200A). As is known in the art, a waveguide is a structure used to guide and propagate electromagnetic waves, such as microwaves or light, along a path with low energy loss. In some embodiments, the waveguide 270 is configured to receive radiation at a wavelength from a laser source and transmit the radiation at that wavelength to the NFT 240. Waveguides for use in HAMR are known in the art and are not described further herein.

As illustrated in FIG. 3A, the NFT 240 includes two portions: an NFT main body 250 and a micropillar 260. The NFT main body 250 has a media-facing surface 251 that faces the magnetic recording layer 560 of the media 516, and a side surface 255 that abuts the adhesion layer 220. As shown in FIG. 3A, the media-facing surface 251 of the NFT main body 250 is separated from the media 516 by at least a distance 252 in the z-direction. As shown in FIG. 3A, the distance 252 (the minimum distance between the media-facing surface 251 of the NFT main body 250 and the media 516) may be the same as the distance 205 (between the main-pole surface 203 and the media 516). In some embodiments, the distance 252 differs from the distance 205.

The NFT main body 250 is made of a material with high thermal stability, such as a plasmonic metal (e.g., gold, silver, aluminum, copper, ruthenium, rhodium, palladium, platinum, iridium, or alloys or combinations thereof). The NFT main body 250 functions as a large plasmon resonator that generates near-field light from plasmons excited by irradiation with light (e.g., from a laser source coupled to the waveguide 270). The NFT main body 250 may have a size that is less than or equal to the wavelength of the light being used to heat the media 516. The NFT main body 250 may have, for example, a generally trapezoidal shape.

The micropillar 260 of the NFT 240 is a smaller-scale structure, also made of a material with high thermal stability, such as a plasmonic metal (e.g., gold, silver, aluminum, copper, ruthenium, rhodium, palladium, platinum, iridium, or alloys or combinations thereof), that is connected, both electrically and physically, to the NFT main body 250. As compared to the NFT main body 250, the micropillar 260 is much smaller; hence the name "micropillar." It is to be understood, however, that the prefix "micro" does not imply any particular relationship between the sizes of the micropillar 260 and the NFT main body 250, nor does it imply any absolute size of the micropillar 260 (e.g., it need not have any particular dimensions, such as dimensions on a micron scale). Instead, as described further below, the micropillar 260 is generally smaller than the NFT main body 250 and extends closer to the media 516 than does the NFT main body 250. The size and shape of both the NFT main body 250 and the micropillar 260 can be optimized, individually or jointly, during the slider design process to achieve specified design requirements and/or constraints (e.g., thermal gradient, hot spot area, hot spot location, light source power, plasmonic efficiency targets, etc.). Such optimization is well within the ordinary level of skill in the art.

Furthermore, in some embodiments, the media-facing surface area of the micropillar 260 is smaller than the media-facing surface area of the NFT main body 250. The combination of the NFT main body 250 and the micropillar 260 is an NFT 240 that provides a higher thermal gradient than conventional NFTs without compromising reliability.

The material used for the micropillar 260 (the material of the micropillar 260) may be the same as or different from the material used for the NFT main body 250 (the material of the NFT main body 250). In other words, the NFT main body 250 and the micropillar 260 may consist essentially of the same material or combination of materials, or, alternatively, the NFT main body 250 may consist essentially of a first material or combination of materials, and the micropillar 260 may consist essentially of a second material or combination of materials, where the first material or combination of materials differs from the second material or combination of materials.

As illustrated in FIG. 3A, the micropillar 260 extends closer to the media 516 than either the main pole 202 or the NFT main body 250 does. In particular, the micropillar 260 has a micropillar surface 261 that is separated from the media 516 by a distance 262. As illustrated in FIG. 3A, the distance 262 is less than the distance 205. In some embodiments, the distance 262 is between about 0.1 nm and about 5 nm. With respect to the main pole 202, the micropillar surface 261 extends a distance 207 closer to the media 516 than the main pole 202 does.

The micropillar 260 also has a side surface 265, which, in the example of FIG. 3A, abuts the adhesion layer 220. The side surface 265 may be flat (e.g., see FIGS. 3B and 3D) or curvilinear or a thin line (e.g., see FIG. 3C). As illustrated in FIG. 3A, the side surface 265 is aligned with the side surface 255 of the NFT main body 250. In the case that the side surface 265 and side surface 255 are flat and aligned (e.g., as shown in FIG. 3A), their union forms a larger flat surface. In the case that one or both of the side surface 265 or side surface 255 is curvilinear, the surface resulting from their union is also curvilinear (at least in some places, assuming they are aligned (e.g., as shown in FIG. 3A)). As illustrated in the example of FIG. 3A, the micropillar 260 is not centered with respect to the NFT main body 250.

Although FIG. 3A shows the side surface 265 and side surface 255 as both aligned and abutting the adhesion layer 220, this is not a requirement. For example, the micropillar 260 could be offset from the adhesion layer 220 in the x-direction by some distance. As explained above, however, the micropillar 260 is not centered with respect to the NFT main body 250. Stated another way, the center of the micropillar 260 is offset from the center of the NFT main body 250 in the x-direction. Specifically, it is closer to the main pole 202 than to the waveguide cladding 272.

As FIG. 3A also illustrates, the micropillar 260 also extends closer to the media 516 than the NFT main body 250 does. In other words, the distance 262 (between the micropillar surface 261 and the media 516) is also less than the distance 252 (between the media-facing surface 251 of the NFT main body 250 and the media 516). Stated another way, the micropillar 260 extends beyond the NFT main body 250 toward the media 516 by a distance 266.

In operation, in combination with the NFT main body 250 and the waveguide 270, the micropillar 260 heats a small, focused region of the media passing below the NFT 240. Unlike lollipop-type of NFTs, in part because the micropillar 260 is covered by the transparent overcoat 230 (described further below), the size, shape, and form factor of the micropillar 260 remain consistent as the data storage device operates. In other words, the position of the micropillar 260 relative to the media 516 does not change when the data storage device is in operation. Instead, it retains its shape and form factor at the temperatures present when the data storage device is in operation and the HAMR device is writing. It is for this reason that the micropillar 260 can be referred to as being "rigid."

As shown in FIG. 3A, the HAMR head 200A also includes a transparent overcoat 230 on the illustrated surfaces of the HAMR head 200A that face the media 516. The transparent overcoat 230 protects the components of the HAMR head 200A from damage due to interactions with the media 516. For example, the transparent overcoat 230 protects the micropillar 260 from damage that might otherwise result because the micropillar 260 is situated closer to the media 516 than the rest of the HAMR head 200A is.

As its name implies, the transparent overcoat 230 is made from a material that is optically transparent at the wavelength(s) used by the HAMR head 200A. An important characteristic of the transparent overcoat 230 is that it is durable. In other words, in contrast to other types of overcoats used in conventional approaches, which may be burnished off as the storage device operates, the transparent overcoat 230 is designed to remain intact as the HAMR head 200A operates. Moreover, unlike overcoats used in conventional approaches, which are flat (two-dimensional), the transparent overcoat 230 has a media-facing surface that is three-dimensional because the micropillar 260 protrudes from the NFT main body 250.

In some embodiments, the transparent overcoat 230 has at least one surface that is substantially perpendicular to the main-pole surface 203. For example, in the HAMR head 200A, the transparent overcoat 230 has a first surface 234 that is also substantially perpendicular to the main-pole surface 203, and it also has a second surface 232 that is substantially perpendicular to the main-pole surface 203. Referring to the coordinate system shown in FIG. 3A, in the z-direction, the second surface 232 is situated between the NFT 240 and the magnetic recording layer 560, and the first surface 234 is situated between the cladding layer 210 and the magnetic recording layer 560. It is to be appreciated that the first surface 234 could, alternatively, be situated between the adhesion layer 220 and the magnetic recording layer 560. In the example illustrated in FIG. 3A, a portion of the micropillar 260 is situated between the second surface 232 and the first surface 234.

The transparent overcoat 230 may be made from any suitable material that provides transparency at the electromagnetic wavelength in use, mitigates or prevents oxidation of the write pole, and provides durability as the HAMR head 200A operates. It is to be understood that "transparent" means that the transparent overcoat 230 passes radiation at the wavelength (or wavelengths) produced by the light source coupled to the waveguide 270 and propagated by the waveguide 270 to the NFT 240. The transparent overcoat 230 may be transparent to some wavelengths and not transparent (or less transparent) to others. The transparent overcoat 230 may comprise an oxide (e.g., silicon dioxide) and/or a nitride (e.g., silicon nitride). As specific examples, the transparent overcoat 230 may comprise one or more of: $Si_3N_4$, $TiO_2$, $ZrO_2$, $HfO_2$, $Nb_2O_5$, $Ta_2O_5$, $Sc_2O_3$, $Y_2O_3$, MgO, SiN, BN, SiBN, and/or SiBNC. In some embodiments, the transparent overcoat is a single layer of pure silicon nitride ($Si_3N_4$), which has a good combination of optical transparency and thermal oxidation resistance. Furthermore, it is a durable material.

The transparent overcoat 230 may be made from a single layer of material, or it may be a multilayer structure. For example, the transparent overcoat 230 may comprise a silicon nitride layer (e.g., film) a medal oxide layer (e.g., film). The transparent overcoat 230 may have any suitable thickness.

It is to be appreciated that other portions of the read-write head and/or slider may be protected by another type of overcoat than the transparent overcoat 230 (e.g., other components or elements, such as, for example, the read head, may be covered by DLC formed on an adhesion film on the slider's recording-layer-facing surface).

The micropillar 260 can have any suitable size and shape, which may be optimized during the design of the slider to achieve performance objectives. For example, the micropillar 260 can be cylindrical, cuboid, pyramidal, etc. Furthermore, the micropillar 260 can be situated at any suitable (x, y) coordinates. Those having ordinary skill in the art will understand how to adjust the size, shape, material, position, and other characteristics of the NFT main body 250 and micropillar 260 in order to meet design targets and constraints (e.g., thermal gradient, hot spot size, hot spot location, ADC, light source power, plasmonic efficiency, etc.).

By inspection of FIG. 3A, it is clear that in an orientation in which the media-facing surface 251 of the NFT main body 250 and the micropillar surface 261 are oriented to face upward, the micropillar surface 261 is situated above media-facing surface 251 and also above the main-pole surface 203.

Figure 3C:
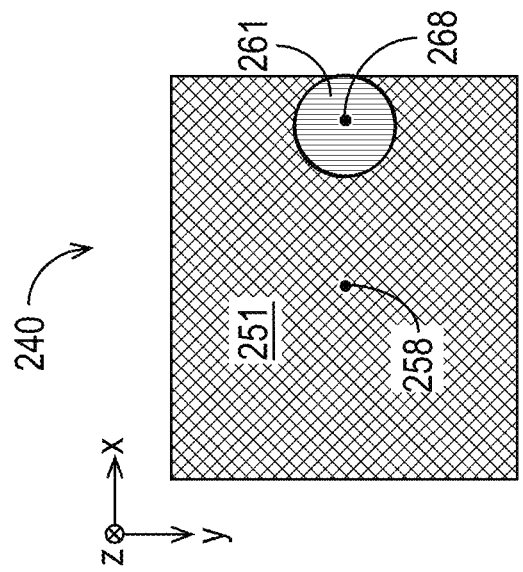
FIG. 3C is another example of an ABS view of the NFT example shown in FIG. 3A in accordance with some embodiments.
Figure 3D:
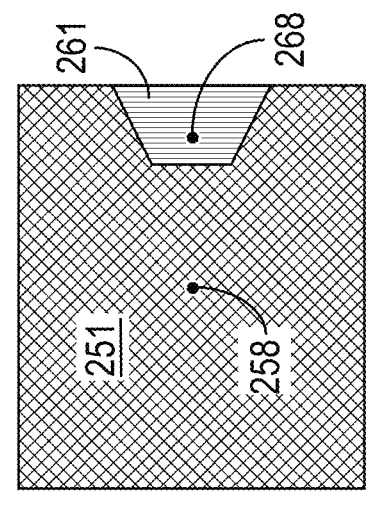
FIG. 3D is another example of an ABS view of the NFT example shown in FIG. 3A in accordance with some embodiments.
Figure 3B:
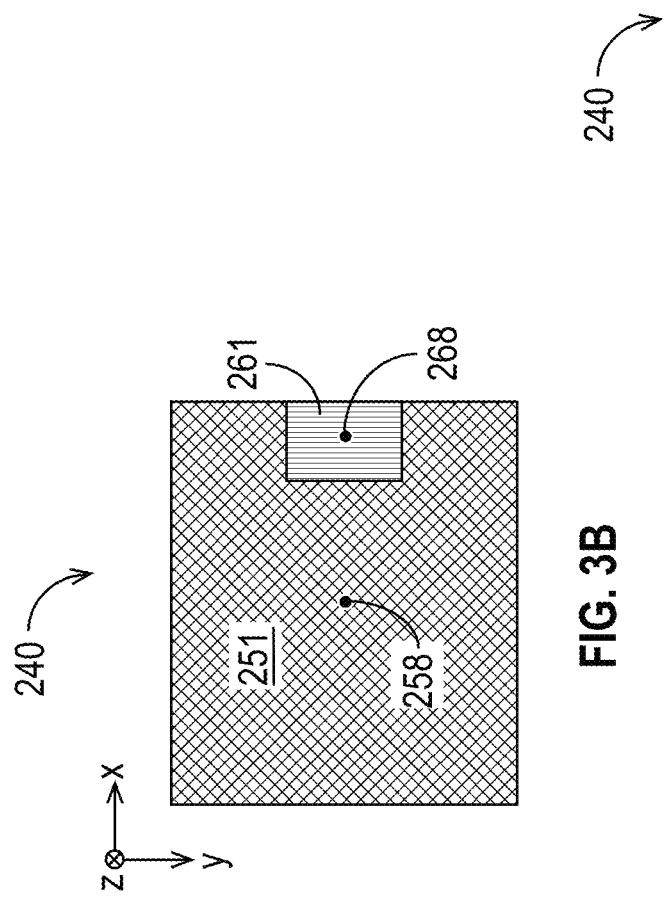
FIG. 3B is an example of an ABS view of the NFT example shown in FIG. 3A in accordance with some embodiments.

FIG. 3B is an example of an ABS view of the NFT 240 example shown in FIG. 3A in accordance with some embodiments. The ABS view is a projection of the three-dimensional HAMR head 200A into two dimensions. Accordingly, in the example ABS view of FIG. 3B, the micropillar 260 is cuboid, and the micropillar surface 261 is rectangular. (It will be appreciated that a square is a special case of a rectangle.) In the ABS view shown in FIG. 3B, the media-facing surface 251 has a geometric center 258, and the micropillar surface 261 has a geometric center 268. It will be appreciated by those having ordinary skill in the art that the geometric center is the central point or location within a geometric figure or shape. The geometric center of a shape can be determined by finding the average of the coordinates of all the points that make up the shape. Using the coordinate system shown in FIG. 3B, this process involves summing up the x-coordinates and y-coordinates of each point and dividing them by the total number of points. For a rectangle, such as both the media-facing surface 251 and the micropillar surface 261 in FIG. 3B, the geometric center is the point of intersection of the two diagonals.

As shown in FIG. 3B, the geometric center 268 of the micropillar 260 is offset from the geometric center 258 of the NFT main body 250. Using the coordinates provided in FIG. 3B, the geometric center 268 is offset from the geometric center 258 in the x-direction. Specifically, and referring also to FIG. 3A, the geometric center 268 is situated closer to the main pole 202 than the geometric center 258 is.

FIG. 3C is another example of an ABS view of the NFT 240 example shown in FIG. 3A in accordance with some embodiments. In the example ABS view of FIG. 3C, the micropillar 260 is cylindrical, and the micropillar surface 261 is circular. In the ABS view shown in FIG. 3C, the media-facing surface 251 has a geometric center 258, and the micropillar surface 261 has a geometric center 268. It will be appreciated that the geometric center of a circle is the center point of the circle.

As shown in FIG. 3C, the geometric center 268 of the micropillar 260 is offset from the geometric center 258 of the NFT main body 250. Using the coordinates provided in FIG. 3C, the geometric center 268 is offset from the geometric center 258 in the x-direction. Specifically, and referring also to FIG. 3A, the geometric center 268 is situated closer to the main pole 202 than the geometric center 258 is.

FIG. 3D is another example of an ABS view of the NFT 240 example shown in FIG. 3A in accordance with some embodiments. In the example of FIG. 3D, the micropillar 260 is a trapezoidal prism, and the micropillar surface 261 is a trapezoid. As will be understood by those having ordinary skill in the art, a trapezoidal prism is a three-dimensional shape that has two parallel bases that are trapezoids and four rectangular faces that connect the bases. In the ABS view shown in FIG. 3D, the media-facing surface 251 has a geometric center 258, and the micropillar surface 261 has a geometric center 268. In a trapezoid, such as the micropillar surface 261, the geometric center is the point of intersection of the two diagonals.

As shown in FIG. 3D, the geometric center 268 of the micropillar 260 is offset from the geometric center 258 of the NFT main body 250. Using the coordinates provided in FIG. 3D, the geometric center 268 is offset from the geometric center 258 in the x-direction. Specifically, and referring also to FIG. 3A, the geometric center 268 is situated closer to the main pole 202 than the geometric center 258 is.

Although FIGS. 3B, 3C, and 3D illustrate the NFT main body 250 as having a rectangular shape in the ABS view, it is to be understood that the NFT main body 250 may have other shapes. For example, as explained above, the NFT main body 250 may have a generally trapezoidal shape. Furthermore, although FIGS. 3B, 3C, and 3D illustrate the micropillar 260 at one edge of the NFT main body 250, as explained above, the position of the micropillar 260 relative to the NFT main body 250 can be selected and/or optimized during the design process. The examples shown herein (e.g., in FIGS. 3B-3D and other similar drawings) are not intended to be limiting.

Figure 4A:
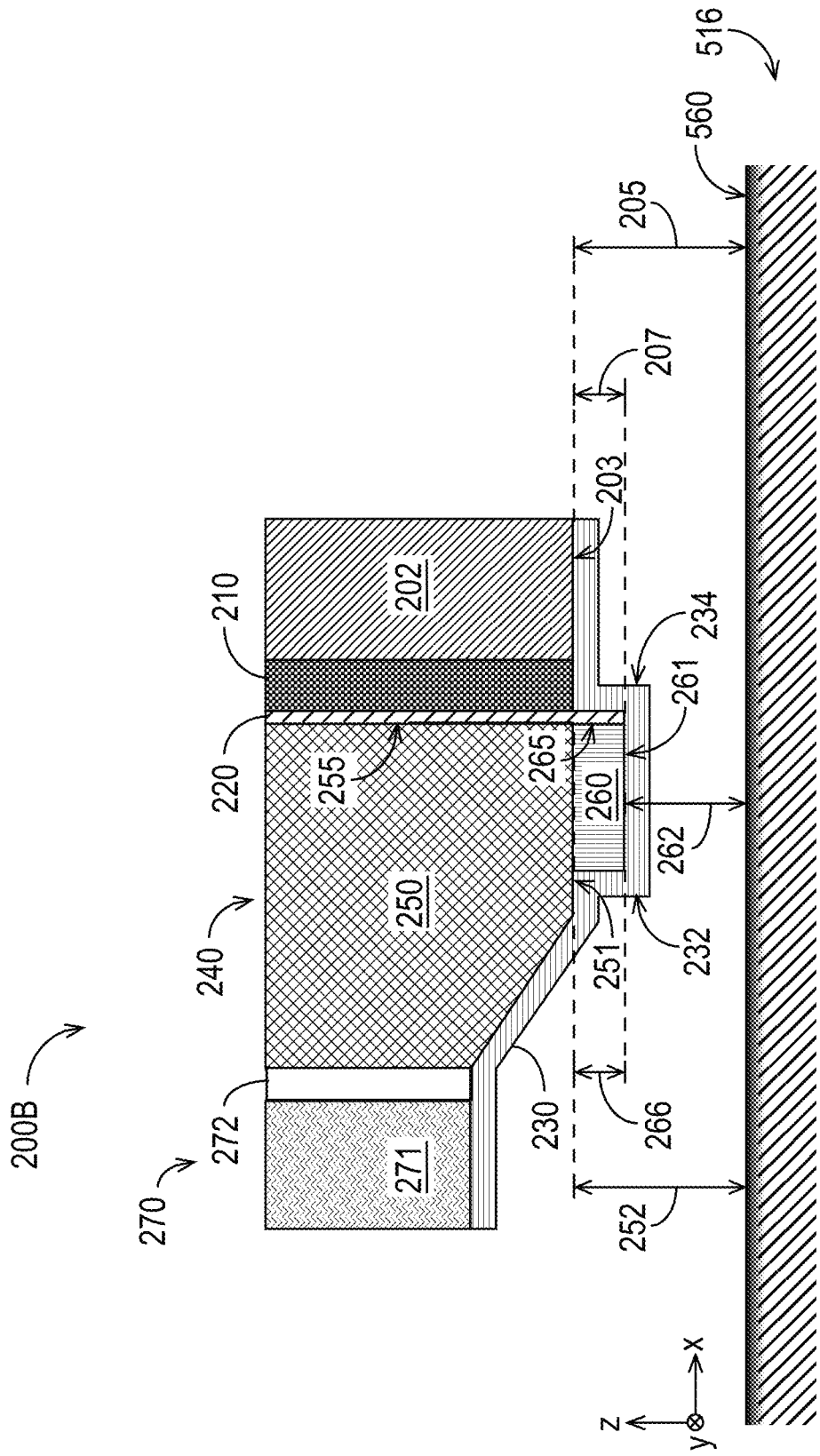
FIG. 4A illustrates an example of a portion of another HAMR head for writing to a magnetic recording layer of a media in accordance with some embodiments.

FIG. 4A illustrates an example of a portion of another HAMR head 200B for writing to a magnetic recording layer 560 of a media 516 in accordance with some embodiments. FIG. 4A shows x-, y-, and z-axes for reference. The view in FIG. 4A is of a cross-section of the HAMR head 200B in the x-z plane, with the media 516 shown below the HAMR head 200B. With the axes as defined in FIG. 4A, the data tracks on the media 516 reside in an x-y plane.

The portion of the HAMR head 200B shown in FIG. 4A comprises a number of components, including a main pole 202, a cladding layer 210, an adhesion layer 220, an NFT 240, a waveguide 270, and a transparent overcoat 230. The main pole 202, cladding layer 210, adhesion layer 220, waveguide 270, and transparent overcoat 230 were described above in the discussion of FIG. 3A. That discussion applies to FIG. 4A as well and is not repeated here. As explained above in the discussion of FIG. 3A, some of the illustrated components may be omitted (e.g., adhesion layer 220), and an implementation of the overall HAMR head may include components or elements not illustrated in FIG. 4A.

Like the NFT 240 shown in FIG. 3A, and as illustrated in FIG. 4A, the NFT 240 includes an NFT main body 250 and a micropillar 260. These components and their characteristics (e.g., materials, media-facing surfaces, etc.) were described in the discussion of FIG. 3A, and those descriptions apply to FIG. 4A as well.

The primary difference between the NFT 240 example shown in FIG. 4A and the NFT 240 example shown in FIG. 3A is that the micropillar 260 of FIG. 4A is larger in the x-dimension and shorter in the z-direction than the micropillar 260 of FIG. 3A. Like the micropillar 260 of FIG. 3A, and as illustrated in FIG. 4A, the micropillar 260 extends closer to the media 516 than either the main pole 202 or the NFT main body 250 does. In particular, the micropillar 260 has a micropillar surface 261 that is separated from the media 516 by a distance 262. In some embodiments, the distance 262 is between about 0.1 nm and about 5 nm. As illustrated in FIG. 3A, the distance between the micropillar surface 261 and the media 516 is less than the distance 205 (between the main-pole surface 203 and the media 516). With respect to the main pole 202, the micropillar surface 261 extends a distance 207 closer to the media 516 than the main pole 202 does.

The micropillar 260 also has a side surface 265, which, in the example of FIG. 4A, abuts the adhesion layer 220. The side surface 265 may be flat (e.g., see FIGS. 4B and 4D) or curvilinear or a thin line (e.g., see FIG. 4C). As illustrated in FIG. 4A, the side surface 265 is aligned with the side surface 255 of the NFT main body 250. In the case that the side surface 265 and side surface 255 are flat and aligned (e.g., as shown in FIG. 4A), their union forms a larger flat surface. In the case that one or both of the side surface 265 or side surface 255 is curvilinear, the surface resulting from their union is also curvilinear (at least in some places, assuming they are aligned (e.g., as shown in FIG. 3A)). As illustrated in the example of FIG. 4A, the micropillar 260 is not centered with respect to the NFT main body 250.

Although FIG. 4A shows the side surface 265 and side surface 255 as both aligned and abutting the adhesion layer 220, this is not a requirement. For example, the micropillar 260 could be offset from the adhesion layer 220 in the x-direction by some distance. As explained above, however, the micropillar 260 is not centered with respect to the NFT main body 250. Stated another way, the center of the micropillar 260 is offset from the center of the NFT main body 250 in the x-direction. Specifically, it is closer to the main pole 202 than to the waveguide cladding 272.

As FIG. 4A also illustrates, the micropillar 260 also extends closer to the media 516 than the NFT main body 250 does. In other words, the distance 262 (the minimum distance between the micropillar surface 261 and the media 516) is also less than the distance 252 (between the media-facing surface 251 of the NFT main body 250 and the media 516). Stated another way, the micropillar 260 extends beyond the NFT main body 250 toward the media 516 by a distance 266.

The micropillar 260 shown in the example of FIG. 4A can have any suitable size and shape, which may be optimized during the design process to achieve performance objectives. For example, the micropillar 260 can be cylindrical, cuboid, pyramidal, etc. Furthermore, the micropillar 260 can be situated at any suitable (x, y) coordinates. Those having ordinary skill in the art will understand how to adjust the size, shape, material, position, and other design aspects of the NFT main body 250 and micropillar 260 in order to meet design targets and constraints (e.g., thermal gradient, hot spot size, hot spot location, ADC, light source power, plasmonic efficiency, etc.).

In the example illustrated in FIG. 4A, the transparent overcoat 230 has at least one surface that is substantially perpendicular to the main-pole surface 203. For example, in the HAMR head 200B, the transparent overcoat 230 has a first surface 234 that is substantially perpendicular to the main-pole surface 203, and it also has a second surface 232 that is also substantially perpendicular to the main-pole surface 203. Referring to the coordinate system shown in FIG. 4A, in the z-direction, the second surface 232 is situated between the NFT 240 and the magnetic recording layer 560, and the first surface 234 is situated between the cladding layer 210 and the magnetic recording layer 560. It is to be appreciated that the first surface 234 could, alternatively, be situated between the adhesion layer 220 and the magnetic recording layer 560. In the example illustrated in FIG. 4A, a portion of the micropillar 260 is situated between the second surface 232 and the first surface 234.

By inspection of FIG. 4A, it is clear that in an orientation in which the media-facing surface 251 of the NFT main body 250 and the micropillar surface 261 are oriented to face upward, the micropillar surface 261 is situated above media-facing surface 251.

Figure 4C:
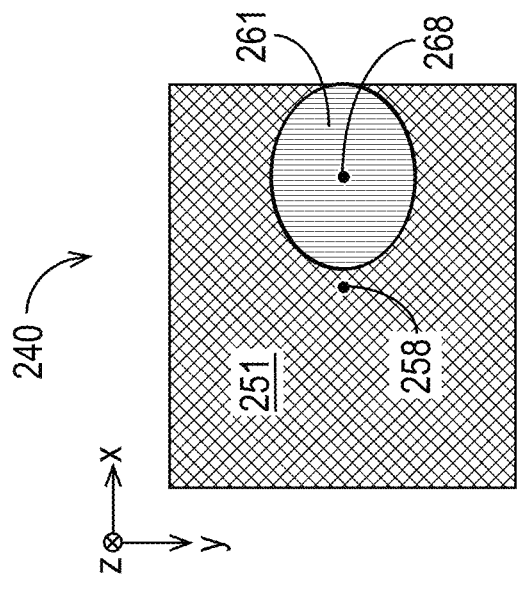
FIG. 4C is another example of an ABS view of the NFT example shown in FIG. 4A in accordance with some embodiments.
Figure 4D:
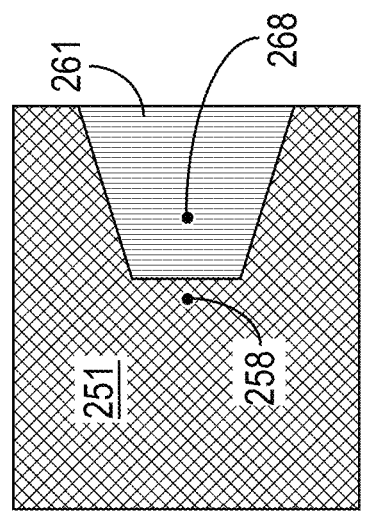
FIG. 4D is another example of an ABS view of the NFT example shown in FIG. 4A in accordance with some embodiments.
Figure 4B:
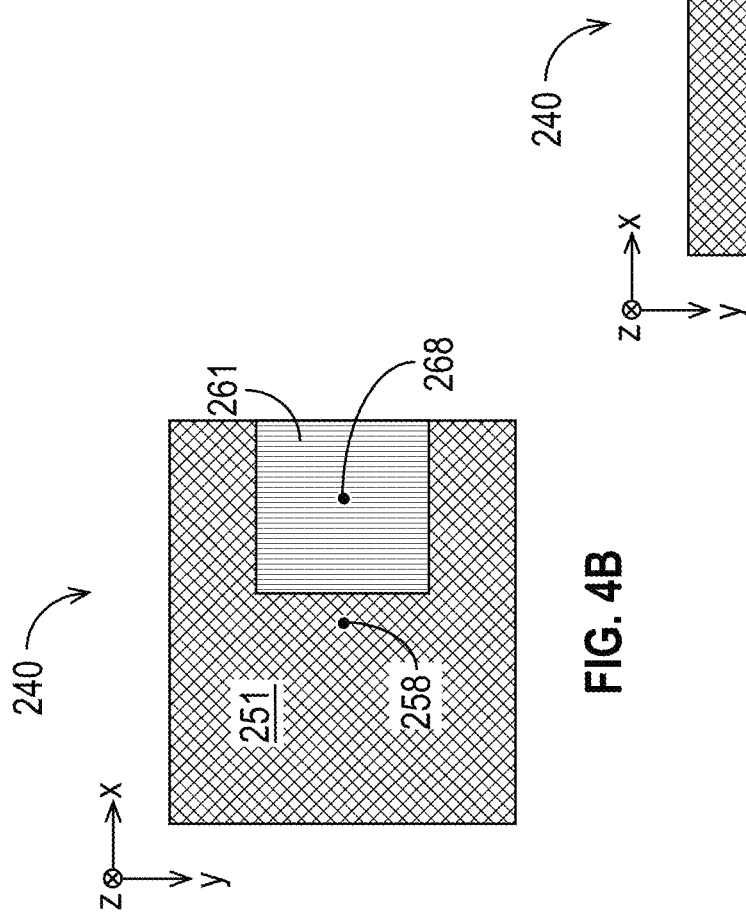
FIG. 4B is an example of an ABS view of the NFT example shown in FIG. 4A in accordance with some embodiments.

FIG. 4B is an example of an ABS view of the NFT 240 example shown in FIG. 4A in accordance with some embodiments. In the example ABS view of FIG. 4B, the micropillar 260 is cuboid, and the micropillar surface 261 is rectangular. In the ABS view shown in FIG. 4B, the media-facing surface 251 has a geometric center 258, and the micropillar surface 261 has a geometric center 268. As shown in FIG. 4B, the geometric center 268 of the micropillar 260 is offset from the geometric center 258 of the NFT main body 250. Using the coordinates provided in FIG. 4B, the geometric center 268 is offset from the geometric center 258 in the x-direction. Specifically, and referring also to FIG. 4A, the geometric center 268 is situated closer to the main pole 202 than the geometric center 258 is.

FIG. 4C is another example of an ABS view of the NFT 240 example shown in FIG. 4A in accordance with some embodiments. In the example ABS view of FIG. 4C, the micropillar 260 is an elliptical cylinder, and the micropillar surface 261 is oval. As those having ordinary skill in the art will understand, an elliptical cylinder is a three-dimensional shape that has two identical circular bases at either end and a curved, oval-shaped surface connecting them. It is to be appreciated that a special case of an elliptical cylinder is a circular cylinder (i.e., a three-dimensional geometric shape that consists of two identical circular bases that are parallel to each other and connected by a curved surface), such as described above in the discussion of FIG. 3C. In the ABS view shown in FIG. 4C, the media-facing surface 251 has a geometric center 258, and the micropillar surface 261 has a geometric center 268. As shown in FIG. 4C, the geometric center 268 of the micropillar 260 is offset from the geometric center 258 of the NFT main body 250. Using the coordinates provided in FIG. 4C, the geometric center 268 is offset from the geometric center 258 in the x-direction. Specifically, and referring also to FIG. 4A, the geometric center 268 is situated closer to the main pole 202 than the geometric center 258 is.

FIG. 4D is another example of an ABS view of the NFT 240 example shown in FIG. 4A in accordance with some embodiments. In the example ABS view of FIG. 4D, the micropillar 260 is a trapezoidal prism, and the micropillar surface 261 is a trapezoid. In the ABS view shown in FIG. 4D, the media-facing surface 251 has a geometric center 258, and the micropillar surface 261 has a geometric center 268. As shown in FIG. 4D, the geometric center 268 of the micropillar 260 is offset from the geometric center 258 of the NFT main body 250. Using the coordinates provided in FIG. 4D, the geometric center 268 is offset from the geometric center 258 in the x-direction. Specifically, and referring also to FIG. 4A, the geometric center 268 is situated closer to the main pole 202 than the geometric center 258 is.

Although FIGS. 4B, 4C, and 4D illustrate the NFT main body 250 as having a rectangular shape in the ABS view, it is to be understood that the NFT main body 250 may have other shapes. For example, as explained above, the NFT main body 250 may have a generally trapezoidal shape. Furthermore, although FIGS. 4B, 4C, and 4D illustrate the micropillar 260 at one edge of the NFT main body 250, as explained above, the position of the micropillar 260 relative to the NFT main body 250 can be selected and/or optimized during the design process. The examples shown herein (e.g., in FIGS. 4B-4D and other similar drawings) are not intended to be limiting.

Figure 5A:
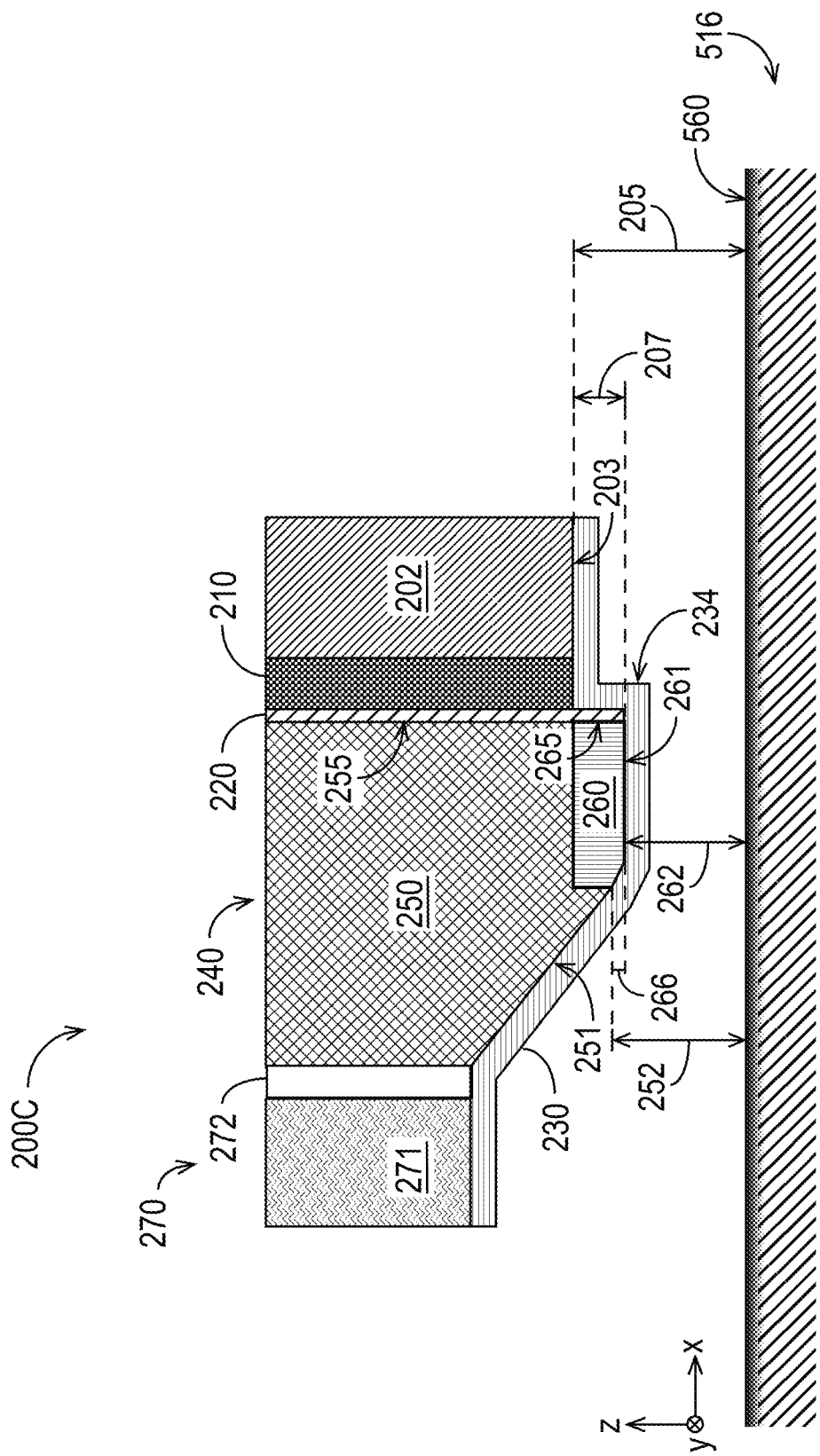
FIG. 5A illustrates an example of a portion of a HAMR head for writing to a magnetic recording layer of a media in accordance with some embodiments.

FIG. 5A illustrates an example of a portion of a HAMR head 200C for writing to a magnetic recording layer 560 of a media 516 in accordance with some embodiments. FIG. 5A shows x-, y-, and z-axes for reference. The view in FIG. 5A is of a cross-section of the HAMR head 200C in the x-z plane, with the media 516 shown below the HAMR head 200C. With the axes as defined in FIG. 5A, the data tracks on the media 516 reside in an x-y plane.

The portion of the HAMR head 200C shown in FIG. 5A comprises a number of components, including a main pole 202, a cladding layer 210, an adhesion layer 220, an NFT 240, a waveguide 270, and a transparent overcoat 230. The main pole 202, cladding layer 210, adhesion layer 220, waveguide 270, and transparent overcoat 230 were described above in the discussion of FIG. 3A. That discussion applies as well to FIG. 5A and is not repeated here. As explained above in the discussion of FIG. 3A, some of the illustrated components may be omitted (e.g., adhesion layer 220), and an implementation of the overall HAMR head may include components or elements not illustrated in FIG. 5A.

In the HAMR head 200C, the transparent overcoat 230 has a first surface 234 that is substantially perpendicular to the main-pole surface 203. Referring to the coordinate system shown in FIG. 5A, in the z-direction, the first surface 234 is situated between the cladding layer 210 and the magnetic recording layer 560. It is to be appreciated that the first surface 234 could, alternatively, be situated between the adhesion layer 220 and the magnetic recording layer 560.

Like the NFT 240 shown in FIG. 3A, and as illustrated in FIG. 5A, the NFT 240 includes an NFT main body 250 and a micropillar 260. The characteristics of the NFT main body 250 and micropillar 260 (e.g., materials, media-facing surfaces, etc.) were described in the discussion of FIG. 3A. That description applies to FIG. 5A as well.

The primary difference between the NFT 240 example shown in FIG. 5A and the NFT 240 example shown in FIG. 4A is that the micropillar 260 of FIG. 5A is partially embedded in the NFT main body 250 (similarly to the micropillar 260 of FIG. 3A), whereas in the example shown in FIG. 4A, the micropillar 260 is situated adjacent to (on top of or below, depending on point of view) the NFT main body 250.

The micropillar 260 also has a side surface 265, which, in the example of FIG. 5A, abuts the adhesion layer 220. The side surface 265 may be flat (e.g., see FIGS. 5B and 5D) or curvilinear or a thin line (e.g., see FIG. 5C). As illustrated in FIG. 5A, the side surface 265 is aligned with the side surface 255 of the NFT main body 250. In the case that the side surface 265 and side surface 255 are flat and aligned (e.g., as shown in FIG. 5A), their union forms a larger flat surface. In the case that one or both of the side surface 265 or side surface 255 is curvilinear, the surface resulting from their union is also curvilinear (at least in some places, assuming they are aligned (e.g., as shown in FIG. 5A)). As illustrated in the example of FIG. 5A, the micropillar 260 is not centered with respect to the NFT main body 250.

Although FIG. 5A shows the side surface 265 and side surface 255 as both aligned and abutting the adhesion layer 220, this is not a requirement. For example, the micropillar 260 could be offset from the adhesion layer 220 in the x-direction by some distance. As explained above, however, the micropillar 260 is not centered with respect to the NFT main body 250. Stated another way, the center of the micropillar 260 is offset from the center of the NFT main body 250 in the x-direction. Specifically, it is closer to the main pole 202 than to the waveguide cladding 272.

Like the micropillar 260 of FIG. 3A and the micropillar 260 of FIG. 4A, the micropillar 260 in FIG. 5A extends closer to the media 516 than either the main pole 202 or any portion of the NFT main body 250 does. In particular, the micropillar 260 has a micropillar surface 261 that is separated from the media 516 by a distance 262. In some embodiments, the distance 262 is between about 0.1 nm and about 5 nm. As illustrated in FIG. 5A, the distance between the micropillar surface 261 and the media 516 is less than the distance 205 (between the main-pole surface 203 and the media 516). With respect to the main pole 202, the micropillar surface 261 extends a distance 207 closer to the media 516 than the main pole 202 does.

At its closest point to the media 516, the media-facing surface 251 of the NFT main body 250 is a distance 252 from the media 516. As FIG. 5A illustrates, the distance 252 (the minimum distance between the media-facing surface 251 of the NFT main body 250 and the media 516) is greater than the distance 262 (between the micropillar surface 261 and the media 516). Accordingly, the micropillar 260 extends closer to the media 516 than the NFT main body 250 does (by the distance 266).

The micropillar 260 shown in the example of FIG. 5A can have any suitable size and shape, which may be optimized during the slider design process to achieve performance objectives. For example, the micropillar 260 can be cylindrical, cuboid, pyramidal, etc. Furthermore, the micropillar 260 can be situated at any suitable (x, y) coordinates. Those having ordinary skill in the art will understand how to adjust the size, shape, material, position, and other design aspects of the NFT main body 250 and micropillar 260 in order to meet design targets and constraints (e.g., thermal gradient, hot spot size, hot spot location, ADC, light source power, plasmonic efficiency, etc.).

In the example illustrated in FIG. 5A, the transparent overcoat 230 has at least one surface that is substantially perpendicular to the main-pole surface 203. For example, in the HAMR head 200C, the transparent overcoat 230 has a first surface 234 that is also substantially perpendicular to the main-pole surface 203. Referring to the coordinate system shown in FIG. 5A, in the z-direction, the first surface 234 is situated between the cladding layer 210 and the magnetic recording layer 560. It is to be appreciated that the first surface 234 could, alternatively, be situated between the adhesion layer 220 and the magnetic recording layer 560.

By inspection of FIG. 5A, it is clear that in an orientation in which the media-facing surface 251 of the NFT main body 250 and the micropillar surface 261 are oriented to face upward, the micropillar surface 261 is situated above media-facing surface 251.

Figure 5C:
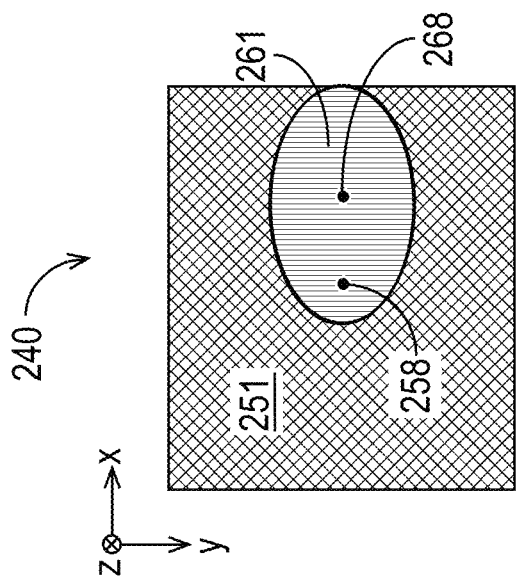
FIG. 5C is another example of an ABS view of the NFT example shown in FIG. 5A in accordance with some embodiments.
Figure 5D:
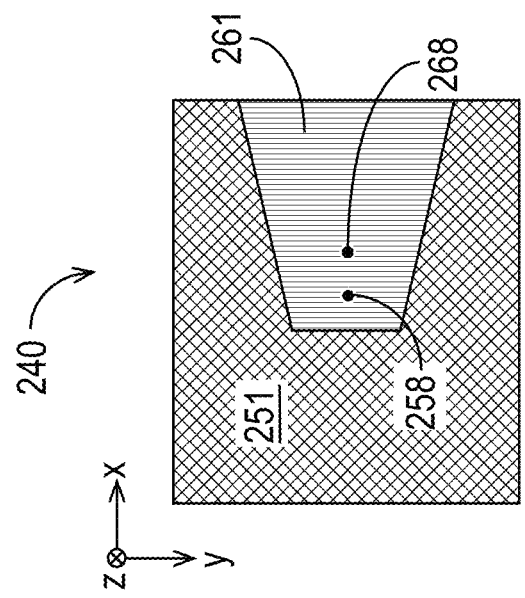
FIG. 5D is another example of an ABS view of the NFT example shown in FIG. 5A in accordance with some embodiments.
Figure 5B:
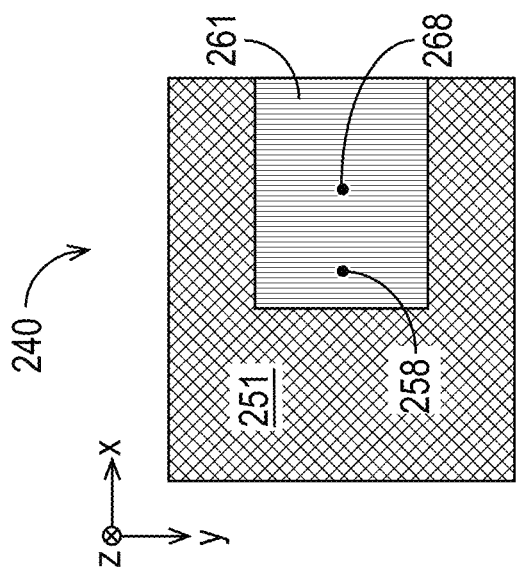
FIG. 5B is an example of an ABS view of the NFT example shown in FIG. 5A in accordance with some embodiments.

FIG. 5B is an example of an ABS view of the NFT 240 example shown in FIG. 5A in accordance with some embodiments. In the example ABS view of FIG. 5B, the micropillar 260 is cuboid, and the micropillar surface 261 is rectangular. In the ABS view shown in FIG. 5B, the media-facing surface 251 has a geometric center 258, and the micropillar surface 261 has a geometric center 268. As shown in FIG. 5B, the geometric center 268 of the micropillar 260 is offset from the geometric center 258 of the NFT main body 250. Using the coordinates provided in FIG. 5B, the geometric center 268 is offset from the geometric center 258 in the x-direction. Specifically, and referring also to FIG. 5A, the geometric center 268 is situated closer to the main pole 202 than the geometric center 258 is.

FIG. 5C is another example of an ABS view of the NFT 240 example shown in FIG. 5A in accordance with some embodiments. In the example ABS view of FIG. 5C, the micropillar 260 is an elliptical cylinder, and the micropillar surface 261 is oval. In the ABS view shown in FIG. 5C, the media-facing surface 251 has a geometric center 258, and the micropillar surface 261 has a geometric center 268. As shown in FIG. 5C, the geometric center 268 of the micropillar 260 is offset from the geometric center 258 of the NFT main body 250. Using the coordinates provided in FIG. 5C, the geometric center 268 is offset from the geometric center 258 in the x-direction. Specifically, and referring also to FIG. 5A, the geometric center 268 is situated closer to the main pole 202 than the geometric center 258 is.

FIG. 5D is another example of an ABS view of the NFT 240 example shown in FIG. 5A in accordance with some embodiments. In the example ABS view of FIG. 5D, the micropillar 260 is a trapezoidal prism, and the micropillar surface 261 is a trapezoid. In the ABS view shown in FIG. 5D, the media-facing surface 251 has a geometric center 258, and the micropillar surface 261 has a geometric center 268. As shown in FIG. 5D, the geometric center 268 of the micropillar 260 is offset from the geometric center 258 of the NFT main body 250. Using the coordinates provided in FIG. 5D, the geometric center 268 is offset from the geometric center 258 in the x-direction. Specifically, and referring also to FIG. 5A, the geometric center 268 is situated closer to the main pole 202 than the geometric center 258 is.

Although FIGS. 5B, 5C, and 5D illustrate the NFT main body 250 as having a rectangular shape in the ABS view, it is to be understood that the NFT main body 250 may have other shapes. For example, as explained above, the NFT main body 250 may have a generally trapezoidal shape. Furthermore, although FIGS. 5B, 5C, and 5D illustrate the micropillar 260 at one edge of the NFT main body 250, as explained above, the position of the micropillar 260 relative to the NFT main body 250 can be selected and/or optimized during the design process. The examples shown herein (e.g., in FIGS. 5B-5D and other similar drawings) are not intended to be limiting.

As explained above, the micropillar 260 can have any suitable shape, which can be optimized during the design process to provide a suitably-positioned and suitably-shaped hot spot on the media 516. For example, the micropillar 260 can be tapered along the z-direction (e.g., narrower closer to the micropillar surface 261 than closer to the media-facing surface 251 of the NFT main body 250). In addition, the media-facing surface 251 and/or the micropillar surface 261 need not lie in an x-y plane. One or both of the media-facing surface 251 and/or micropillar surface 261 can be at an angle relative to an x-y plane (e.g., as some or all of the media-facing surface 251 is in FIGS. 3A, 4A, and 5A). The examples shown and described in the context of FIGS. 3A, 3B, 3C, 3D, 4A, 4B, 4C, 4D, 5A, 5B, 5C, and 5D are merely illustrative examples of the NFT 240 and are not intended to be limiting.

Moreover, as explained above, the micropillar 260 can be situated on top of the NFT main body 250 (see, e.g., FIG. 4A), or, alternatively, the micropillar 260 can be partially embedded in the NFT main body 250 (see, e.g., FIGS. 3A and 5A). This aspect of the overall NFT 240 design can be selected based on any number of factors that will be appreciated by those having ordinary skill in the art, such as, for example, manufacturing capabilities and/or manufacturing convenience. It will be appreciated that when the material used for the NFT main body 250 is the same as the material used for the micropillar 260, any portion of the micropillar 260 considered to be "embedded" in the NFT main body 250 may be indistinguishable from the rest of the NFT main body 250. Therefore, in some circumstances, the distinction between an embedded micropillar 260 and a micropillar 260 that is adjacent to (on top of or below) a NFT main body 250 is mainly for convenience of explanation.

As described above, the NFT 240 designs described herein offer significant improvements relative to conventional approaches. The use of a micropillar 260 allows the NFT 240 to provide a higher thermal gradient in a more focused location on the media 516, thereby allowing improvements to ADC due the NFT 240 supporting a smaller magnetic write width. Moreover, because the thermal gradient is higher, a lower waveguide power can be used to provide the same thermal gradient as conventional NFTs. In addition, tests confirm that the use of a micropillar 260 causes the NFT 240 to heat up less during operation.

The benefits of the NFT 240 designs described herein were validated via modeling. FIG. 6A illustrates the trend of the normalized waveguide power (e.g., laser power) needed to achieve a constant peak media temperature as a function of the height of the micropillar 260 (or distance 266). As FIG. 6A indicates, as the distance 266 increases (i.e., the micropillar surface 261 of the micropillar 260 extends further from the media-facing surface 251), and therefore the distance 262 decreases, the amount of power needed to achieve a specified peak media temperature also decreases.

FIG. 6B illustrates the temperature increase of the NFT main body 250 of the NFT 240 as a function of the height of the micropillar 260 (or distance 266) as the HAMR device operates with the peak media temperature held constant. As FIG. 6B indicates, the temperature increase of the NFT main body 250 decreases as the micropillar surface 261 of the micropillar 260 extends further from the media-facing surface 251 (i.e., as the distance 266 increases).

FIG. 6C illustrates the media write width of a HAMR device as a function of the height of the micropillar 260 (or distance 266) when the HAMR device operates with the peak media temperature held constant. As FIG. 6C shows, the media write width decreases as the micropillar surface 261 of the micropillar 260 extends further from the media-facing surface 251 (i.e., as the distance 266 increases).

Figure 7:
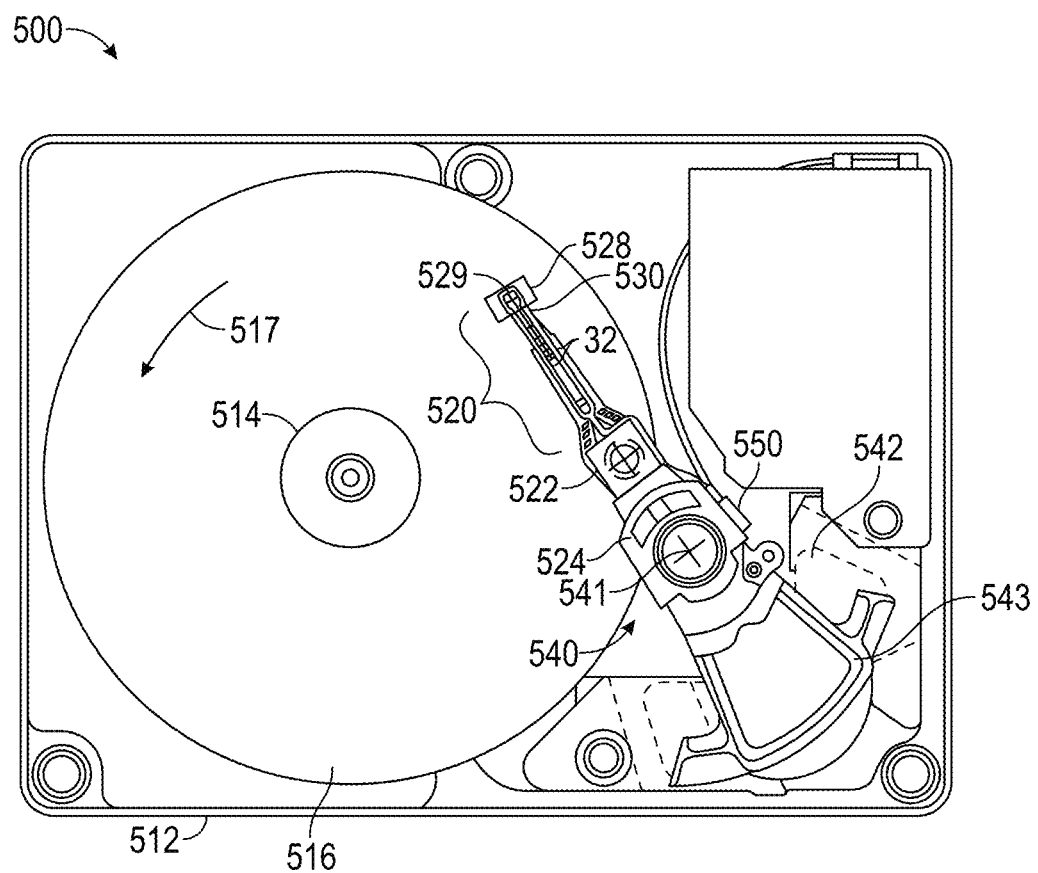
FIG. 7 is a top view of an example of a data storage device into which the disclosed HAMR devices can be incorporated.

FIG. 7 is a top view of an example of a data storage device 500 into which the disclosed HAMR devices (e.g., HAMR head 200A, HAMR head 200B, HAMR head 200C) can be incorporated. FIG. 7 illustrates a head/disk assembly of the data storage device 500 with the cover removed. The data storage device 500 includes a rigid base 512 supporting a spindle 514 that supports at least one media 516. The spindle 514 is rotated by a spindle motor (not shown), which, in operation, rotates the at least one media 516 in the direction shown by the curved arrow 517. The data storage device 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to an air-bearing (or, in the case that helium or another gas is used instead of air inside the disk drive, a gas-bearing) slider 528. A magnetic recording read/write head 529 is located at the end or trailing surface of the slider 528. The write head 529 may include embodiments of the HAMR head (e.g., HAMR head 200A, HAMR head 200B, HAMR head 200C) described herein. The flexure 530 enables the slider 528 to "pitch" and "roll" on an air (or gas) bearing generated by the media 516 as it rotates.

The data storage device 500 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. When energized by control circuitry (not shown), the voice coil 543 moves and thereby rotates E-block 524 with the rigid arms 522 and the at least one load beam assembly 520 to position the read/write head over the data tracks on the media 516. The array 32 of electrically conductive interconnect traces or lines connects at one end to the read/write head 529 and at its other end to read/write circuitry contained in an electrical module or chip 550, which, in the data storage device 500 of FIG. 7, is secured to a side of the E-block 524. The chip 550 includes a read/write integrated circuit (R/W IC).

As the media 516 rotates, the media 516 drags air under the slider 528 and along the air-bearing surface (ABS) of the slider 528 in a direction approximately parallel to the tangential velocity of the media 516. As the air passes under the ABS, air compression along the air flow path causes the air pressure between the media 516 and the ABS to increase, which creates a hydrodynamic lifting force that counteracts the tendency of the at least one load beam assembly 520 to push the slider 528 toward the media 516. The slider 528 thus flies above the media 516 but in close proximity to the surface of the media 516.

The slider 528 supports a read/write head 529, which in at least some of the embodiments disclosed herein is a HAMR head that includes an inductive write head, the NFT, and an optical waveguide. (As stated previously, the term "HAMR" as used herein refers to all variants of thermally-assisted recording, including TAR, TAMR, EAMR, and HAMR.) A semiconductor laser with a wavelength of 780 to 980 nm may be used as the HAMR light source. The laser may be supported on the top of the slider 528, or it may be located on the flexure 530 and coupled to the slider 528 by an optical channel. As the media 516 rotates in the direction of the curved arrow 517, the movement of the rotary actuator assembly 540 allows the HAMR head on the slider 528 to access different data tracks on the media 516. The slider 528 is typically formed of a composite material, such as a composite of alumina/titanium-carbide ($Al_2O_3$/TiC). FIG. 7 illustrates only one media 516 surface with the slider 528 and read/write head 529, but there may be multiple media 516 stacked on a hub that is rotated by a spindle motor, with a separate slider 528 and read/write head 529 associated with each surface of each media 516.

In operation, after the voice coil 543 has positioned the read/write head 529 over the data tracks on the media 516, the read/write head 529 may be used to write information to one or more tracks on the surface of the media 516 and to read previously-recorded information from the tracks on the surface of the media 516. The tracks may comprise discrete data islands of magnetizable material (e.g., bit-patterned media), or the media 516 may have a conventional continuous magnetic recording layer of magnetizable material. Processing circuitry in the data storage device 500 (e.g., on the chip 550) provides to the read/write head 529 signals representing information to be written to the media 516 and receives from the read/write head 529 signals representing information read from the media 516.

To read information from the media 516, the read/write head 529 may include at least one read sensor. The read sensor(s) in the read/write head 529 may include, for example, one or more giant magnetoresistance (GMR) sensors, tunneling magnetoresistance (TMR) sensors, or another type of magnetoresistive sensor. When the slider 528 passes over a track on the media 516, the read/write head 529 detects changes in resistance due to magnetic field variations recorded on the media 516, which represent the recorded bits.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As an example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A magnetic storage device comprising:
   a media comprising a magnetic recording layer; and
   a heat-assisted magnetic recording (HAMR) head for writing to the magnetic recording layer, the HAMR head comprising:
      a waveguide;
      a main pole comprising a main-pole surface facing the magnetic recording layer;
      a near-field transducer (NFT) situated between the main pole and the waveguide, wherein the NFT comprises a main body and a micropillar, wherein the micropillar comprises a micropillar surface facing the magnetic recording layer, wherein a first distance between the micropillar surface and the media is less than a second distance between the main-pole surface and the media; and
      a transparent overcoat situated on the main-pole surface and the micropillar surface, wherein a media-facing surface of the transparent overcoat is three-dimensional.

2. The magnetic storage device recited in claim 1, wherein at least one surface of the transparent overcoat is substantially perpendicular to the main-pole surface.

3. The magnetic storage device recited in claim 2, further comprising an adhesion layer and/or a cladding layer situated between the NFT and the main pole, and wherein the at least one surface of the transparent overcoat is situated (a) between the NFT and the magnetic recording layer, (b) between the adhesion layer and the magnetic recording layer, or (c) between the cladding layer and the magnetic recording layer.

4. The magnetic storage device recited in claim 1, wherein a first surface of the transparent overcoat and a second surface of the transparent overcoat are substantially perpendicular to the main-pole surface.

5. The magnetic storage device recited in claim 4, wherein at least a portion of the micropillar is situated between the first surface of the transparent overcoat and the second surface of the transparent overcoat.

6. The magnetic storage device recited in claim 1, wherein a side surface of the main body is aligned with a side surface of the micropillar.

7. The magnetic storage device recited in claim 6, wherein the side surface of the main body and the side surface of the micropillar abut an adhesion layer situated between the NFT and the main pole.

8. The magnetic storage device recited in claim 1, wherein, in an air-bearing surface view of the HAMR head, a geometric center of the micropillar is offset from a geometric center of the main body.

9. The magnetic storage device recited in claim 8, wherein the geometric center of the micropillar is closer to the main pole than the geometric center of the main body is.

10. The magnetic storage device recited in claim 1, wherein the main body and the micropillar consist essentially of a same material or combination of materials.

11. The magnetic storage device recited in claim 10, wherein the same material or combination of materials comprises gold, silver, aluminum, copper, ruthenium, rhodium, palladium, platinum, iridium, or alloys or combinations thereof.

12. The magnetic storage device recited in claim 1, wherein the first distance is between approximately 0.1 nm and approximately 5 nm.

13. The magnetic storage device recited in claim 1, wherein the transparent overcoat comprises at least one of an oxide or a nitride, wherein the oxide or the nitride comprises silicon.

14. The magnetic storage device recited in claim 1, wherein the main body consists substantially of a first material or combination of materials, and the micropillar consists substantially of a second material or combination of materials, wherein the first material or combination of materials differs from the second material or combination of materials.

15. The magnetic storage device recited in claim 1, wherein, in an ABS view, a shape of a media-facing surface of the micropillar is rectangular, square, oval, circular, or trapezoidal.

16. A heat-assisted magnetic recording (HAMR) head for writing to a magnetic recording layer, the HAMR head comprising:
   a near-field transducer (NFT) comprising:
      a main body comprising a media-facing surface, and
      a micropillar comprising a micropillar surface, wherein, in an orientation in which the media-facing surface and the micropillar surface are oriented to face upward, the micropillar surface is situated above the media-facing surface; and
   a transparent overcoat situated over the media-facing surface and the micropillar surface, wherein a media-facing surface of the transparent overcoat is three-dimensional.

17. The HAMR head recited in claim 16, wherein, in the orientation in which the media-facing surface and the micropillar surface are oriented to face upward, the micropillar is on top of the main body.

18. The HAMR head recited in claim 16, wherein the micropillar is embedded in the main body.

19. The HAMR head recited in claim 16, wherein a distance between the media-facing surface and the micropillar surface is between approximately 0.1 nm and approximately 5 nm.

20. The HAMR head recited in claim 16, wherein the transparent overcoat is durable.

21. The HAMR head recited in claim 16, wherein the main body and the micropillar consist essentially of a same material or combination of materials wherein the same material or combination of materials comprises gold, silver, aluminum, copper, ruthenium, rhodium, palladium, platinum, iridium, or alloys or combinations thereof.

22. The HAMR head recited in claim 16, wherein the main body consists substantially of a first material or combination of materials, and the micropillar consists substantially of a second material or combination of materials, wherein the first material or combination of materials differs from the second material or combination of materials.

23. The HAMR head recited in claim 16, wherein the transparent overcoat comprises at least one of an oxide or a nitride.

24. The HAMR head recited in claim 16, wherein, in an air-bearing surface view of the HAMR head, a geometric center of the micropillar is offset from a geometric center of the main body.

25. A data storage device comprising:
a media comprising the magnetic recording layer; and
the HAMR head recited in claim 16.

* * * * *